Patented Dec. 19, 1950

2,534,308

UNITED STATES PATENT OFFICE 2,534,308

ROSIN-CONTAINING MIXED ESTERS

Leon Shechter, East Orange, and John M. Whelan, Jr., Lyndhurst, N. J., assignors, by mesne assignments, to Union Carbide and Carbon Corporation, a corporation of New York No Drawing. Application October 27, 1948, Serial No. 56,918

6 Claims. (Cl. 106—222)

This invention relates to rosin esters that find wide application in the cheaper grades of protective and decorative coatings to impart hardness and gloss to drying oil films. Rosin itself is rarely used because of its harmful acidic nature, and it is therefore converted into esters by reaction with glycerol whereby the decided advantages of improved durability, moisture-resistance and freedom from livering with basic pigments are obtained. Complete esterification, however, is difficult, and decomposition occurs. It has therefore been proposed to incorporate rosin as an acid reactant in conjunction with a dibasic acid, such as maleic acid, for mixed esterification; generally, however, these mixed esters are not recommended for use alone in coating compositions, since they lack toughness, and their main utility has been found to be that of blending agents in nitrocellulose lacquers (Synthetic Resins, by Ellis (1935), page 912).

According to the present invention rosin-containing esters that possess improved hardness, increased melting point and chemical resistance are obtained without loss of solubility in common drying oils to yield varnish films of excellent physical and chemical properties. This is brought about by the inclusion as a second acidic reactant a polymer product of reaction of ketene with an unsaturated aldehyde, when the polymer is produced preferably by passing the reactants in about equimolecular proportions into an inert solvent having present therein a catalyst of the Friedel-Crafts or clay types and at low temperatures. Under these conditions of preparation the ketene-aldehyde product appears to be largely a polymeric ester, and the unsaturated aldehydes found useful are the acrolein series having the general structure $R_1$—$CR_2$=$CR_3$—CHO, wherein $R_1$, $R_2$ and $R_3$ can be hydrogen or monovalent aliphatic, alicyclic, aryl or aralkyl groups; representative aldehydes are acrolein, croton-aldehyde, 2,4-hexadienal-1, octatrienal, cinnamic aldehyde, etc.

For the ketene-unsaturated aldehyde reaction both the temperature and the type of catalyst appear to be directive influences in controlling the character of the product. At temperatures of 60° to 70° C. and an acid catalyst of the X—$SO_3H$ type (X being a non-metallic atom other than hydrogen), acyl-oxydienes (O—C linkage) apparently predominate (Agett, U. S. 2,421,976). Low temperatures of —50° to +30° C. and a Friedel-Crafts catalyst, particularly boron trifluoride, aluminum chloride and zinc chloride, direct the building on of more carbons (C—C linkage) to the aldehyde; other catalysts that operate to yield products of this nature are found to be the clays characterized by containing hydrous aluminum silicate, such as "Attapulgus earth," fuller's earth, etc.

Typical of the general polymeric ester-forming reaction is that of ketene and crotonaldehyde. In the presence, for example, of about 0.1 to 0.5 gram of boron trifluoride for a mole of reactant and methyl-butyl ether as an inert organic solvent (included in amount to control the viscosity) and at a temperature between 5° and 10° C., the reaction product of $$H_3C-CH=CH-CHO+H_2C=CO$$

may be considered under these conditions to be a monomer unit having the C—C linkage

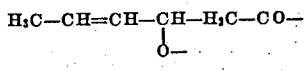

that polymerizes by addition to

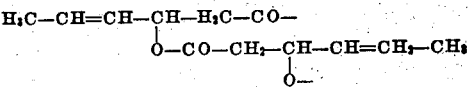

The dangling terminal valences are probably satisfied by the conversion of the carbonyl groups to carboxyls and of the oxygens to hydroxyls, or by unsaturation resulting from dehydration of a so-converted hydroxyl chain end. After the completion of the reaction a Friedel-Crafts type of catalyst is destroyed by washing the solution with a small amount of water and alkali; the clay type catalyst needs only to be filtered out of the solution.

A chemical investigation of the foregoing polymeric product showed very little free monomeric acid (less than 2%) and the presence of polymeric esters of 3-hydroxy-hex 4-en 1-oic and 4- or 5-hydroxy-hex 2-en 1-oic acids. The total yield of polymeric material was in excess of 95 per cent, and hydrogenation thereof yielded about 80 per cent of the six-carbon acids: caproic 40–45 per cent, delta-caprolactone 10–15 per cent, trans-hexen-2-oic 15–25 per cent, and other products. These esters were of a low degree of polymerization (probably under 5 and an average of about 2.5). The saponification numbers (e. g. 628), however, were found to be considerably higher than expected from the polymeric esters (calculated 501), thus indicating some form of terminal carboxyl group reaction with other ingredients present in the mass. That the reaction product, moreover, can be regarded as being primarily a polymeric ester, corresponding to the condensation of the hydroxyl group of a hydroxy monocarboxylic acid molecule with the acid group of another molecule, also appears from the observation that the product reacts much more slowly with glycerol than the acid monomer unit.

For the preparation of the mixed esters, the polyhydric alcohol commonly selected is glycerol; but mixtures of alcohols having a functionality of more than two, such as glycol plus glycerol, and the higher alcohols, such as polyglycols and polyglycerols, erythritol and pentaerythritol and their polymers, arabitol, mannitol, sorbitol, trimethylol-propane, poly-β-hydroxy-ethoxy-benzenes, etc. likewise yield esters that are useful in varnish films. Generally about 10 per cent in excess of the theoretical requirements for complete esterification by the alcohol is incorporated, since relatively small quantities of free acid offer points of attack by alkali and moisture to destroy the film continuity. It is to be observed, however, that the polymer contributes little to the acid value, either in the processing or in the final product, since the acid groups are largely in an esterified condition.

The marked improvements in the product resulting from the inclusion of the polymer appear to be due to the introduction of conjugated unsaturations through dehydrations that permit a high degree of crossbonding by carbon-to-carbon linkages rather than ester linkages and for that reason far more stable. The ratio of polymer to rosin is obviously subject to wide variation, but the effects of the polymer become markedly noticeable on a molar basis of about 0.1 mole of polymer unit (calculated as having a molecular weight equal to that of ketene plus the unsaturated aldehyde) to 0.9 mole of rosin; the ratio can be extended to about 0.9 mole of polymer unit to 0.1 mole of rosin without requiring material change in the customary esterification processing, though best carried out in the presence of a hydrocarbon solvent (xylene, etc.).

The preparation of the mixed esters is illustrated by the following examples:

Example 1

| | Grams |
|---|---|
| Polymer solution at 41.7% solids | 202.0 |
| Rosin, pale | 453.0 |
| Glycerol, 98% | 77.5 |

The mixture was melted in a vessel having an agitator under an inert atmosphere with stirring and then heated to 260° C.; in this operation the polymer solvent (isopropyl ether) and water of esterification were driven off. After 15 hours at 260° C. the product was poured into a pan and allowed to cool. The product had an acid value of 6.0, melting point of 208° F. and a color of 15 Gardner when dissolved in an equal weight of toluene; it was readily soluble in drying oils to give an air-drying varnish film characterized by toughness and chemical and water resistance.

Example 2

| | Grams |
|---|---|
| Polymer solution at 46% solids | 629 |
| Rosin, W. W. grade | 1,700 |
| Glycerol, 98% | 387 |

As before the mixture was melted under an inert atmosphere, stirred and heated to 240° C., where it was maintained for 28 hours and then poured into a pan to cool. The product had a melting point of 271° F., acid value of 4.1 and color (1:1 in toluene) of 17 Gardner; the solubility in linseed oil was excellent and a 25 gallon tung oil cook gelled on a hot plate in 39.5 minutes (tung oil alone gelled in 28.5 minutes). The varnish films from both oils air-dried to tough, hard and resistant films.

Example 3

| | Grams |
|---|---|
| Polymer solution at 41.7% solids | 538.0 |
| Rosin, pale | 302.0 |
| Glycerol, 98% | 103.2 |

The mixture was melted in an inert atmosphere, stirred and heated to 240° C. in a vessel having a reflux condenser with a return water-separator; enough xylene was added to maintain a moderate reflux rate at 240° C., and after refluxing for one hour, the batch was allowed to cool. A vacuum (24 inches Hg) was applied to remove solvent as the batch was reheated to 240° C. during one hour, and the batch was poured into a pan to harden. It had an acid value of 2.3, melting point of 215° F. and color 18 Gardner (1:1 toluene); it was soluble in drying oils, and gave films that air-dried to tough and resistant character.

Example 4

| | Grams |
|---|---|
| Polymer solution in diisopropyl ether (41.7% solids) | 269.0 |
| Rosin (#1 grade) | 302.0 |
| Pentaerythritol | 149.6 |

The ingredients were fused together under an inert atmosphere while raising the temperature to 250° C. The solvent introduced with the polymer and water of esterification were allowed to distill off. After a reaction time of 10 hours at 250° C. an acid value of 39.5 was attained. The resulting resin was poured into a flat pan and cooled; it was a brittle, clear-brown material.

A varnish prepared from this resin required some care because of the tendency to remain incompatible with the drying oil and to gel. A varnish was obtained by heating one part by weight of the resin with ½ part of bodied linseed oil (Q viscosity) to 440° F. adding another ½ part of the same oil, reheating to 440° F., holding ½ hour, adding one part of the same oil, and holding at 540° F. until a viscosity of E (Gardner-Holdt) at 44.2% non-volatiles in mineral spirits was reached (about ¾ hour). On addition of 0.1% cobalt and 0.4% lead as naphthenates on the varnish solids, a film dried overnight to a light-colored, hard, tough coating.

Example 5

| | Grams |
|---|---|
| Polymer solution (as in Example 4) | 269.0 |
| Rosin (#1 grade) | 302.0 |
| Trimethylolpropane | 196.7 |

The ingredients were melted and stirred in an inert atmosphere. Volatile materials were allowed to distill off, and the temperature was raised to 250° C. After 24 hours at 250° C., the product was poured into a flat pan and cooled; it was a tacky, dark brown resin exhibiting a very slow flow at room temperature, and the acid value was 4.3.

A varnish was made by holding one part by weight of the resin and two parts of Q viscosity linseed oil at 560° F. for two hours or until a viscosity at 44.5% of non-volatiles in mineral spirits was attained of E (Gardner-Holdt). On adding 0.1% cobalt and 0.4% lead as naphthenates, a film of the product dried overnight to yield a satisfactory coating.

What is claimed is:

1. Process of preparing a mixed ester which comprises reacting ketene with an unsaturated aldehyde of the acrolein series at a temperature ranging from −50 to +30° C. in the presence of a catalyst selected from the group consisting of the Friedel-Crafts and clay types, and esterifying the product together with rosin by means of a polyhydric alcohol having a functionality of more than two.

2. Polyhydric alcohol mixed ester of rosin and a C—C linkage reaction product of ketene with an unsaturated aldehyde of the acrolein series produced in accordance with the process of claim 1.

3. Mixed ester according to claim 2 in which the alcohol is glycerol.

4. Mixed ester according to claim 2 in which the aldehyde is crotonaldehyde.

5. Process of preparing a mixed ester which comprises reacting together equimolar proportions of ketene and crotonaldehyde at a temperature ranging from −50 to +30° C. in the presence of a catalyst selected from the group consisting of the Friedel-Crafts and clay types to a polymer reaction product having C—C linkages and esterifying the product together with rosin by means of a polyhydric alcohol having a functionality of more than two, the molar ratio of polymer to rosin being between 0.1 mole of polymer unit (calculated as a molecular weight equal to that of the ketene and crotonaldehyde) to 0.9 mole of rosin and 0.9 mole of polymer unit to 0.1 mole of rosin.

6. Varnish comprising a drying oil and a polyhydric alcohol mixed ester of rosin and a C—C linkage reaction product of ketene and an unsaturated aldehyde of the acrolein series produced in accordance with the process of claim 1.

LEON SHECHTER.
JOHN M. WHELAN, Jr.

REFERENCES CITED

The following references are of record in the file of this patent:

UNITED STATES PATENTS

| Number | Name | Date |
|---|---|---|
| 2,421,976 | Agett | June 10, 1947 |
| 2,470,964 | Witcoff | May 24, 1949 |